UNITED STATES PATENT OFFICE.

JOHN C. PENNINGTON, OF PATERSON, NEW JERSEY.

RETTING-BATH.

SPECIFICATION forming part of Letters Patent No. 509,396, dated November 28, 1893.

Application filed November 25, 1892. Serial No. 453,122. (No specimens.)

*To all whom it may concern:*

Be it known that I, JOHN C. PENNINGTON, a citizen of the United States, residing at Paterson, in the county of Passaic and State of New Jersey, have invented certain new and useful Improvements in Methods of Retting Flax, &c.; and I do hereby declare the following to be a full, clear, and exact description of the invention, such as will enable others skilled in the art to which it appertains to make and use the same.

The object of retting is to free the fibers from the stalks, bark, &c., and to weaken and partially rot the stalks, so as to make them easy to break without rotting the fibers, and to clean the fibers and render them fit to spin. Retting is accomplished through the agency of bacteria and other microbes which destroy the gum and extractive matters. It is, in fact, a partially putrefactive fermentation. To show that it is the microbes that do the work and not the mere solvent action of the water, if the water is at so high a temperature or contains such chemical substances as kill or retard the multiplication and growth of microbes, the retting will be stopped, although the solvent power of the water would naturally be increased thereby.

My improvement in this process consists in adding to the retting-water, water containing microbes known to be suitable for retting in the best manner, and in adding to it such soft salts and oxides as shall furnish alimentation to the microbes and facilitate their vigorous growth and multiplication, the whole being kept at a proper heat.

To put my invention into practice, I add to the retting-water, water known to be favorable to a good ret; for instance, water from the river Lys, in Belgium; or I select certain microbes by means of gelatine according to Koch's method, put them into water, and then add to the water a certain quantity of potash, phosphoric acid, and nitrogen, the potash being preferably presented or exhibited as such by itself, and the phosphoric acid, and nitrogen, being preferably exhibited, respectively, in the form of phosphate of soda, and ammonia. The proportions I prefer to use, are as follows: to ten thousand parts of water, one part of potash, a half part of phosphoric acid, and a nitrogenous substance in sufficient quantity to present a half part of nitrogen. These ingredients and proportions give satisfactory results; but, when it is desirable to hasten the retting, I add to the substances above specified, the following: one-fourth part of sulphate of magnesia, and one-eighth part of chloride of manganese, and, in cases where the water does not naturally contain it, one-fourth part of lime.

The whole is treated at 80° to 100° Fahrenheit. Under these circumstances, flax straw may be retted thoroughly in from thirty-six to forty-eight hours, and the quality of the fiber will be found to be excellent, uniformly retted, and the straw easily broken, scutched, and cleaned.

Having thus fully described my invention, what I claim as new, and desire to secure by Letters Patent, is—

1. The process of producing a bath or steep for retting flax or other fibrous plants, which consists in supplying to the water a liquid containing microbes known to produce proper retting, and adding thereto substances containing potash, phosphoric acid, and nitrogen, substantially as described.

2. The process of producing a bath or steep for retting flax, or other fibrous plants, which consists in supplying to water a liquid containing microbes known to produce proper retting, and adding substances containing nitrogen, phosphoric acid, sulphuric acid, chlorine, magnesia, and potash, substantially as described.

3. A composition of matter to be employed in retting, consisting of water, potash, ammonia, phosphate of soda, sulphate of magnesia, and chloride of manganese, substantially in the proportions specified.

In testimony whereof I affix my signature in presence of two witnesses.

JOHN C. PENNINGTON.

Witnesses:
JOHN R. BEAM,
LIZZIE HODGKINS.